United States Patent
Rajagopalan (10) Patent No.: US 12,372,390 B2
(45) Date of Patent: Jul. 29, 2025

(54) CORIOLIS MASS FLOW RATE SENSOR

(71) Applicant: Malema Engineering Corporation, Boca Raton, FL (US)

(72) Inventor: Jayasekar Rajagopalan, Cupertino, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 268 days.

(21) Appl. No.: 18/313,900

(22) Filed: May 8, 2023

(65) Prior Publication Data

US 2024/0377236 A1    Nov. 14, 2024

(51) Int. Cl.
 *G01F 1/84*    (2006.01)
 *G01F 15/00*   (2006.01)

(52) U.S. Cl.
 CPC .......... *G01F 1/8413* (2013.01); *G01F 1/8404* (2013.01); *G01F 1/845* (2013.01); *G01F 15/006* (2013.01)

(58) Field of Classification Search
 CPC ........ G01F 1/84; G01F 1/8404; G01F 1/8409; G01F 1/8413; G01F 1/8418
 See application file for complete search history.

(56) References Cited

U.S. PATENT DOCUMENTS

| | | | |
|---|---|---|---|
| 3,803,912 A | 4/1974 | Ohno | |
| 4,252,028 A | 2/1981 | Smith et al. | |
| 4,491,025 A | 1/1985 | Smith et al. | |
| 4,768,385 A | 9/1988 | Caae | |
| 4,823,613 A | 4/1989 | Cage et al. | |
| 4,852,409 A | 8/1989 | Herzl | |
| 4,934,196 A | 6/1990 | Romano | |
| 5,038,620 A | 8/1991 | Rogers et al. | |
| 5,343,764 A | 9/1994 | Mattar et al. | |
| 5,370,002 A | 12/1994 | Normen et al. | |
| 5,373,634 A | 12/1994 | Lipp | |
| 5,373,745 A | 12/1994 | Caqe | |
| 6,156,144 A | 12/2000 | Lueqhamer | |
| 6,383,423 B1 | 5/2002 | Kurokawa et al. | |

(Continued)

FOREIGN PATENT DOCUMENTS

| | | |
|---|---|---|
| CN | 87107806 | 6/1988 |
| CN | 1426531 | 6/2003 |

(Continued)

OTHER PUBLICATIONS

International Search Report and Written Opinion in International Application No. PCT/US2014/051861, mailed on Dec. 22, 2014, 10 pages.

(Continued)

*Primary Examiner* — Erika J. Villaluna
(74) *Attorney, Agent, or Firm* — Fish & Richardson P.C.

(57) ABSTRACT

Devices and methods include a Coriolis flow meter including a first and second manifolds made from a polymer material. Each manifold includes a respective tubular port extension extending outward from a surface of the manifold. A flow-sensitive tube made from the polymer material is attached at a first end to the first tubular port extension and attached at a second end to the second tubular port extension. An isolating structure is clamped around a portion of the first tubular port extension and positioned adjacent to the surface of the first manifold. The isolating structure is made from a second material different from the polymer material.

22 Claims, 8 Drawing Sheets

(56) References Cited

U.S. PATENT DOCUMENTS

| | | |
|---|---|---|
| 6,450,042 B1 | 9/2002 | Lanham et al. |
| 6,598,488 B1 | 7/2003 | Sutton et al. |
| 6,662,120 B2 | 12/2003 | Drahm et al. |
| 6,748,813 B1 | 6/2004 | Barget et al. |
| 6,776,053 B2 | 8/2004 | Schlosser et al. |
| 6,802,224 B2 | 10/2004 | Nakao et al. |
| 6,904,667 B2 | 6/2005 | Lanham et al. |
| 7,127,815 B2 | 10/2006 | Schlosser et al. |
| 7,350,421 B2 | 4/2008 | Anklin-Imhof et al. |
| 7,562,585 B2 | 7/2009 | Schuetze et al. |
| 7,716,995 B2 | 5/2010 | Patten et al. |
| 8,404,076 B2 | 3/2013 | Young et al. |
| 8,887,578 B2 | 11/2014 | Young et al. |
| 9,217,664 B2 | 12/2015 | Lanham et al. |
| 9,435,695 B2 | 9/2016 | Mansfield |
| 9,677,921 B2 | 6/2017 | Young |
| 10,209,113 B2 | 2/2019 | Young et al. |
| 10,260,922 B2 | 4/2019 | Young |
| 11,300,435 B2 | 4/2022 | Malani et al. |
| 11,585,687 B2 | 2/2023 | Malani et al. |
| 11,619,532 B2 | 4/2023 | Malani et al. |
| 2002/0139199 A1 | 10/2002 | Lanham et al. |
| 2003/0097882 A1 | 5/2003 | Schlosser et al. |
| 2003/0191598 A1 | 10/2003 | Normen |
| 2005/0103122 A1 | 5/2005 | Dille |
| 2005/0252307 A1 | 11/2005 | Andresen et al. |
| 2006/0048897 A1 | 3/2006 | Temple |
| 2006/0201260 A1 | 9/2006 | Drahm et al. |
| 2006/0283264 A1 | 12/2006 | Zangenberg |
| 2007/0234824 A1 | 10/2007 | Bitto et al. |
| 2009/0075129 A1 | 3/2009 | Sparks et al. |
| 2010/0251830 A1 | 10/2010 | Bitto et al. |
| 2010/0331644 A1 | 12/2010 | Neale et al. |
| 2011/0000315 A1 | 1/2011 | Tsubota et al. |
| 2011/0167910 A1 | 7/2011 | Storm et al. |
| 2011/0197650 A1 | 8/2011 | Young et al. |
| 2013/0042700 A1 | 2/2013 | Wang et al. |
| 2013/0086986 A1 | 4/2013 | Lanham et al. |
| 2013/0174670 A1 | 7/2013 | Young et al. |
| 2014/0060161 A1 | 3/2014 | Schick et al. |
| 2014/0174561 A1 | 6/2014 | Hagihara et al. |
| 2014/0188421 A1 | 7/2014 | Fraser et al. |
| 2015/0053021 A1 | 2/2015 | Young |
| 2015/0268082 A1 | 9/2015 | Kirst et al. |
| 2015/0300861 A1 | 10/2015 | Regen et al. |
| 2015/0377673 A1 | 12/2015 | Seeley et al. |
| 2017/0146380 A1 | 5/2017 | Young et al. |
| 2017/0248456 A1 | 8/2017 | Young |
| 2017/0059377 A1 | 10/2017 | DeKalb |
| 2018/0179486 A1 | 6/2018 | Fadell et al. |
| 2019/0279888 A1 | 9/2019 | Gopalakrishnan et al. |
| 2020/0011718 A1 | 1/2020 | Skinkle |
| 2020/0116612 A1 | 4/2020 | Ruetten et al. |
| 2020/0249071 A1 | 8/2020 | Cunningham et al. |
| 2020/0319006 A1 | 10/2020 | Malani et al. |
| 2021/0164826 A1 | 6/2021 | McAnally et al. |
| 2021/0318154 A1 | 10/2021 | Malani et al. |
| 2022/0049810 A1 | 2/2022 | Centofante |
| 2022/0214200 A1 | 7/2022 | Malani et al. |
| 2022/0236092 A1 | 7/2022 | Malani et al. |
| 2023/0194321 A1 | 6/2023 | Malani et al. |
| 2023/0243684 A1 | 8/2023 | Malani et al. |

FOREIGN PATENT DOCUMENTS

| | | |
|---|---|---|
| CN | 1882800 | 12/2006 |
| CN | 102782463 | 11/2012 |
| CN | 206989514 | 2/2018 |
| CN | 113543921 | 10/2021 |
| CN | 214471132 | 10/2021 |
| DE | 102019134605 | 6/2021 |
| EP | 0190810 | 8/1986 |
| EP | 0258827 | 3/1988 |
| EP | 0258827 A1 | 3/1988 |
| EP | 0689931 A2 | 1/1996 |
| JP | S6318219 | 1/1988 |
| JP | H08052805 | 2/1996 |
| JP | H09501493 | 2/1997 |
| JP | H09057856 | 3/1997 |
| JP | 2003525437 | 8/2003 |
| JP | 2005510701 | 4/2005 |
| JP | 2005510703 | 4/2005 |
| JP | 2011058950 | 3/2011 |
| JP | 2012025008 | 2/2012 |
| JP | 2013519878 | 5/2013 |
| KR | 10-1609734 | 4/2016 |
| TW | 201518692 | 5/2015 |
| WO | WO 2017190823 | 11/2017 |

OTHER PUBLICATIONS

EngineeringToolBox.com [online], "Metals and Alloys—Bulk modulus elasticity," retrieved from URL<https://www.engineeringtoolbox.com/bulk-modulus-metals-d_1351.html#:~:text=Bulk%20Modulus%20of%20Elasticity%20is,material%20subjected%20to%20axial%20loading.&text=Stainless%20steel%20with%20Bulk%20Modulus,Modulus%202.15%20109%20Pa.>, 4 pages.

Extended European Search Report in European Appln. No. 23167175.1, dated Sep. 27, 2023, 9 pages.

Extended European Search Report in European Patent Application No. 14838532.1, Sep. 7, 2016, 9 pages.

Extended European Search Report in European Patent Application No. 21735838.1, dated Mar. 29, 2022, 9 pages.

International Search Report and Written Opinion in International Appln. No. PCT/US2024/28108, mailed on Aug. 22, 2024, 13 pages.

International Search Report and Written Opinion in International Application No. PCT/US16/63398, mailed on Feb. 15, 2017, 13 pages.

International Search Report and Written Opinion in International Appln. No. PCT/US2020/026258, mailed on Jun. 29, 2020, 13 pages.

International Search Report and Written Opinion in International Appln. No. PCT/US2021/22497, mailed on Jun. 3, 2021, 11 pages.

International Search Report and Written Opinion in International Appln. No. PCT/US2022/048615, mailed on Mar. 3, 2023, 8 pages.

Kim et al., "Effective gamma-ray sterilization and characterization of conductive polypyrrole biomaterials, " Nature, Feb. 27, 2018, 10 pages.

Liens et al. "On the potential of bulk metallic glasses for dental implantology: Case Study on Ti40Zr10Cu36Pd14," Materials, Feb. 2018, 11(2):249.

malema.com [online], "Malema Sensors SumoFlo Single-Use Coriolis Flow Meter CPFM-8103 Series," Dec. 31, 2020, retrieved on Jan. 19, 2021, retrieved from URL<www.malema.com/content/images/uploaded/DS-2020/IM%20SUMOFLO%20S3%20024150.pdf>, 9 pages.

Office Action in Chinese Patent Application No. 201080063688.8, dated Apr. 4, 2014, 6 pages (with English translation).

Office Action in Chinese Patent Application No. 20140046308.8, mailed on Aug. 11, 2017, 8 pages (with English translation).

Office Action in Chinese Patent Application No. 20140046308.8, mailed on Nov. 25, 2016, 22 pages (with English translation).

Office Action in Japanese Patent Application No. 2016-536409, mailed on Sep. 26, 2017, 5 pages (with English translation).

Office Action in Korean Appln. No. 10-2023-0046747, mailed on May 27, 2024, 2 pages (with English translation).

Office Action in Korean Patent Application No. 10-2012-7023722, mailed on Jan. 15, 2014, 10 pages (with English translation).

Office Action in Taiwanese Application No. 105138710, mailed on Aug. 2, 2017, 10 pages (with English translation).

Office Action in Taiwanese Application No. 105138710, mailed on May 17, 2018, 10 pages (with English translation).

CORIOLIS MASS FLOW RATE SENSOR

TECHNICAL FIELD

The present application relates to measuring fluid mass flow rates.

BACKGROUND

Coriolis mass flow meters can be used to measure the mass flow rate of a fluid flowing through a closed conduit based on Coriolis principles. A liquid or gas flows through a tube that is being vibrated by a small actuator. The vibrations generate Coriolis accelerations in the liquid or gas flowing through the tube. The Coriolis acceleration of the fluid stream produces a force acting on the tube that can be measured as a phase shift in the vibration frequency of the tube. The phase shift in the frequency is related to the inertia of the flow tube including the fluid flowing inside of the tube. A calibrated flow meter can determine the mass flow rate of the fluid flowing through the meter based on the shift in vibration frequency.

SUMMARY

This disclosure describes devices and method for measuring fluid mass flow rates.

In one aspect a Coriolis flow meter includes a first manifold made from a polymer material and including a first tubular port extension extending outward from a surface of the first manifold; a second manifold made from the polymer material and including a second tubular port extension extending outward from a surface of the second manifold; a flow-sensitive tube made from the polymer material, the flow-sensitive tube attached at a first end to the first tubular port extension and attached at a second end to the second tubular port extension; and an isolating structure clamped around a portion of the first tubular port extension and positioned adjacent to the surface of the first manifold, the isolating structure made from a second material different from the polymer material.

In one aspect, a method for fabricating a Coriolis flow meter includes fabricating a first manifold made from a polymer material including a first tubular port extension extending outward from a surface of the first manifold; fabricating a second manifold made from the polymer material including a second tubular port extension extending outward from a surface of the second manifold; fabricating a flow-sensitive tube from the polymer material; welding a first end of the flow-sensitive tube to the first tubular port extension and welding a second end of the flow-sensitive tube to the second tubular port extension; and clamping an isolating structure around a portion of the first tubular port extension and positioned adjacent to the surface of the first manifold, the isolating structure made from a second material different from the polymer material.

In one aspect, a method includes providing a first manifold made from a polymer material including a first tubular port extension extending outward from a surface of the first manifold; providing a second manifold made from the polymer material including a second tubular port extension extending outward from a surface of the second manifold; providing a flow-sensitive tube made from the polymer material; welding a first end of the flow-sensitive tube to the first tubular port extension and welding a second end of the flow-sensitive tube to the second tubular port extension; and clamping an isolating structure around a portion of the first tubular port extension and positioned adjacent to the surface of the first manifold, the isolating structure made from a second material different from the polymer material.

Implementations of these aspects can include one or more of the following features.

In some implementations, the isolating structure isolates the flow-sensitive tube from vibrations external to the Coriolis flow meter.

In some implementations, the isolating structure includes stainless steel.

In some implementations, the isolating structure is clamped around a portion of the first tubular port extension and the second tubular port extension and positioned adjacent to both the surface of the first manifold and the surface of the second manifold.

In some implementations, the flow-sensitive tube is a U-shaped tube, a V-shaped tube, or an Ω-shaped tube.

In some implementations, these aspects further include a second isolating structure clamped around a portion of the second tubular port extension and positioned adjacent to the surface of the second manifold, and the flow-sensitive tube is a straight tube.

In some implementations, these aspects further include a base, where the isolating structure is mounted to the base; and a protective enclosure connected to the base enclosing the first manifold, the second manifold, and the flow-sensitive tube.

In some implementations, the flow-sensitive tube is welded to the first tubular port extension and to the second tubular port extension.

In some implementations, these aspects further include a second flow-sensitive tube made from the polymer material, and where the first manifold includes a third tubular port extension extending outward from the surface of the first manifold, the second manifold includes a fourth tubular port extension extending outward from the surface of the second manifold, the second flow-sensitive tube is attached at a first end to the third tubular port extension and attached at a second end to the fourth tubular port extension.

In some implementations, the isolating structure is clamped around a respective portion of each of the first, second, third, and fourth tubular port extensions, and positioned adjacent to both the surface of the first manifold and the surface of the second manifold.

In some implementations, the isolating structure includes a first outer shell, a second outer shell, and a center shell, where the first and second tubular port extensions are clamped between the first outer shell and the center shell, and the third and fourth tubular port extensions are clamped between the second outer shell and the center shell.

In some implementations, these aspects further include temporarily inserting a pin, during welding, to a location that is inside the flow-sensitive tube and the first tubular port extension, the location corresponding to a polymer joint, the pin in intimate contact with the polymer joint to prevent polymer from the polymer joint from flowing into the flow-sensitive tube.

In some implementations, the welding further includes locally heating weld surfaces of the first and second tubular port extensions to within a weld temperature range of the polymer material; locally heating the first end and the second end of the flow-sensitive tube to within the weld temperature range of the polymer material; and joining the first end of the flow-sensitive tube to the first tubular port extension and the second end of the flow-sensitive tube to the second tubular port extension simultaneously while each end of the flow-sensitive tube and each weld surface are within the weld temperature range of the polymer material.

In some implementations, the flow-sensitive tube is a straight tube.

In some implementations, these aspects further include mounting the isolating structure to a base; and connecting a protective enclosure to the base enclosing the first and second manifolds and the flow-sensitive tube.

Particular implementations of the subject matter described in this specification can be implemented to realize one or more of the following advantages.

Implementations of the Coriolis flow meter described herein reduce the potential for metal contamination in systems requiring high-purity flow (e.g., semiconductor manufacturing and bio-pharmaceutical processes). The manifolds and flow-sensitive tubes do not include low-melting point fusible alloys thereby reducing or eliminating the risk of contamination of the flow passageway(s) with metal atoms.

In some implementations, the Coriolis flow meter is corrosion resistant. The Coriolis flow meter can withstand corrosive and/or otherwise harsh chemicals used in various industries.

In some implementations, the flow-sensitive tubes can be formed with thin walls improving measurement sensitivity even at low flow rates. In some implementations, the flow-sensitive tubes can be formed from commercially available polymeric tubing formed without sharp corners or abrupt changes in directions resulting in elimination of sites of possible accumulation of slurry solids which can cause increased pressure drops across the flow meter and can create particle contamination.

In some implementations, a separate isolating structure reduces material costs and allows larger flow-sensitive tube sizes and flow rates as compared with a flow meter designed for high flow rates with integral isolating structures made of the polymer material of the manifold and flow-sensitive tubes.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1A:
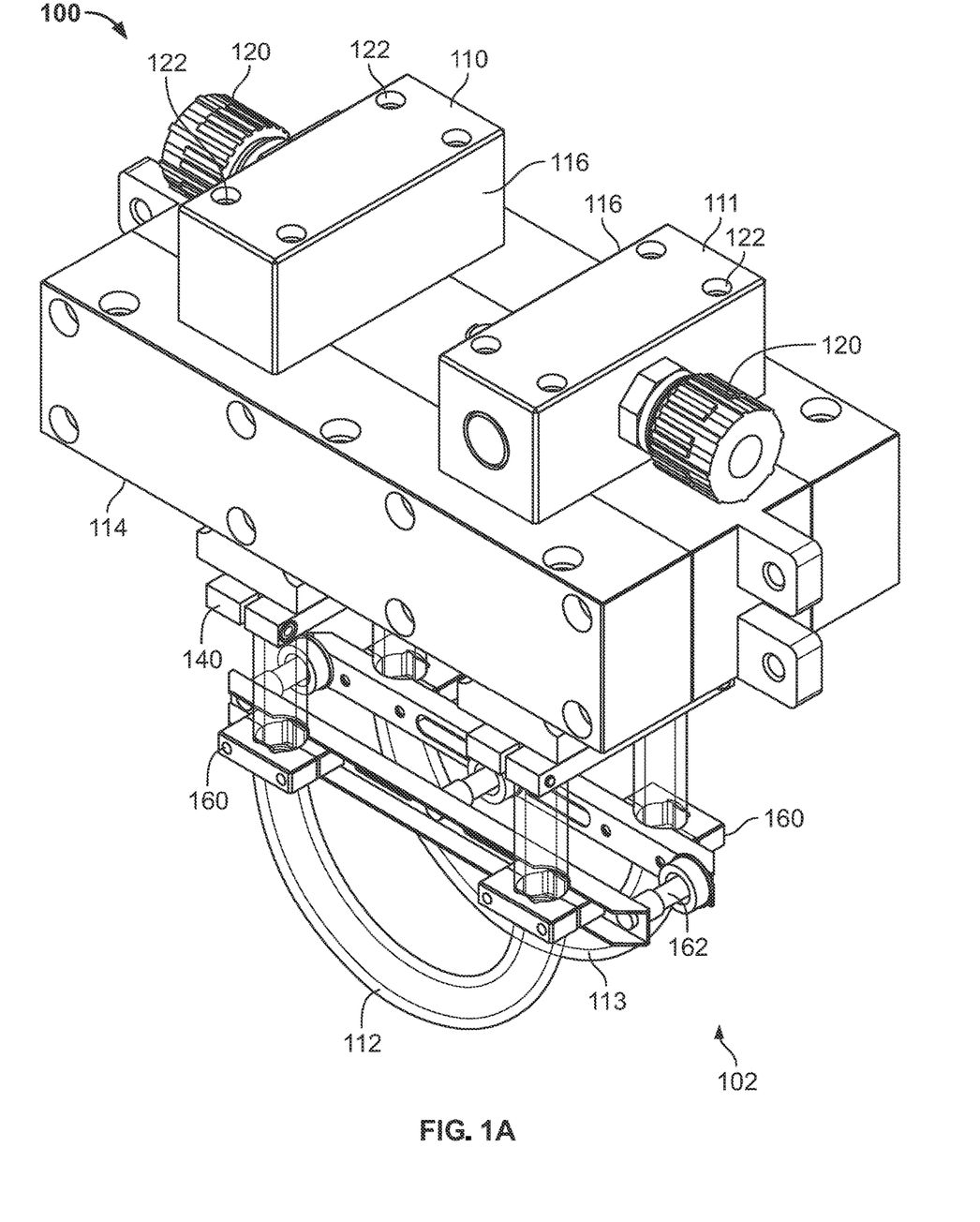
FIG. 1A illustrates an assembled view of a Coriolis flow meter assembly.
Figure 1B:
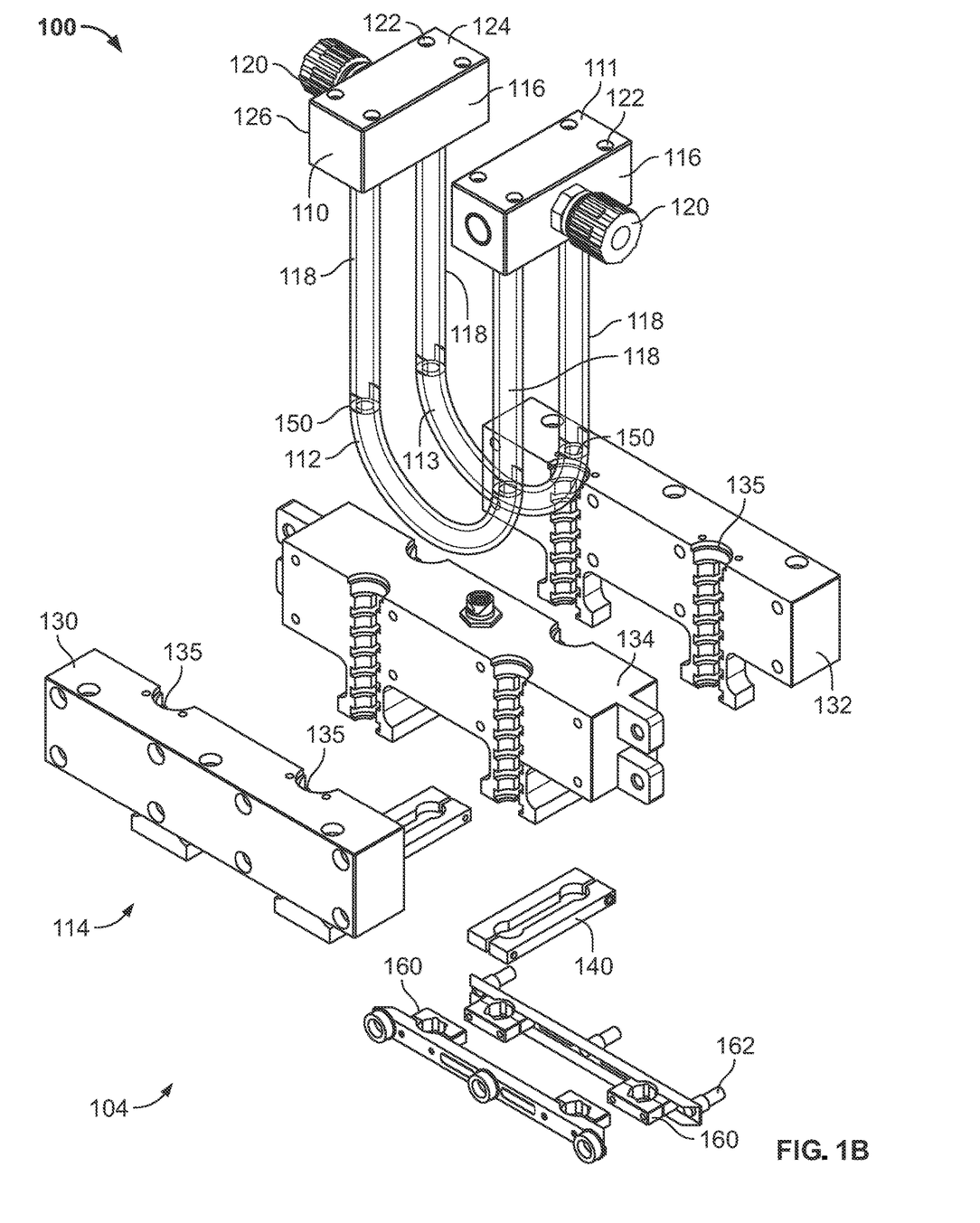
FIG. 1B illustrates an exploded view of a Coriolis flow meter assembly.
Figure 2A:
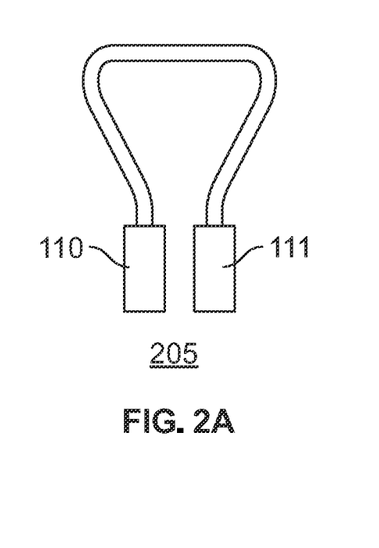
FIGS. 2A-2E illustrate plan views of flow-sensitive tube geometries.
Figure 2B:
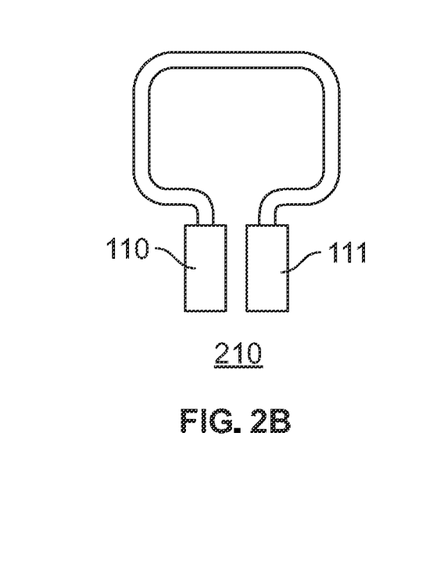
Figure 2C:
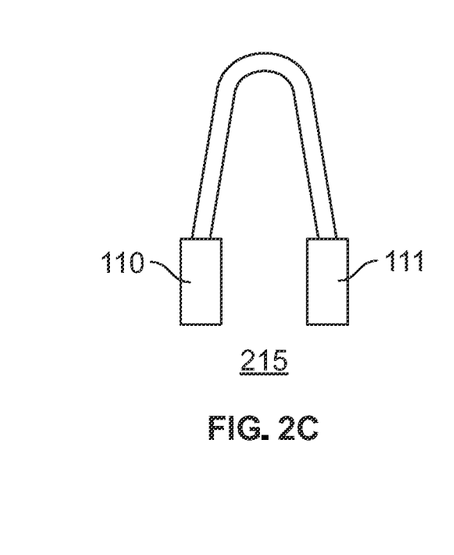
Figure 2D:
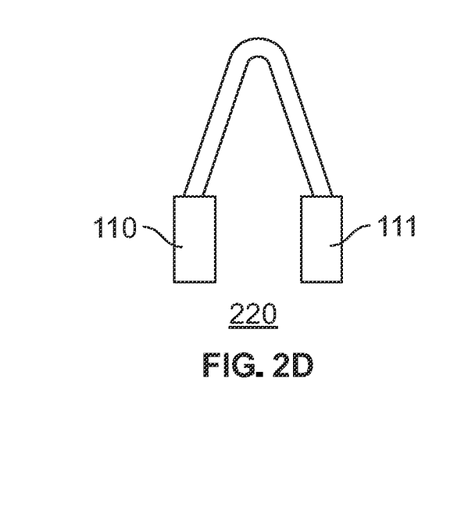
Figure 2E:
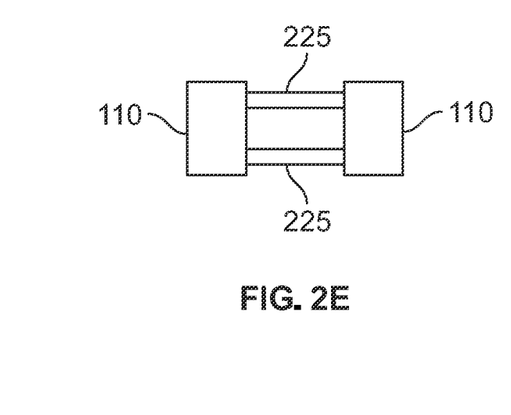

FIGS. 1A and 1B illustrate an example Coriolis flow meter assembly 100. FIG. 1A shows an assembled view 102 of the assembly 100. FIG. 1B shows an exploded view 104 of the assembly 100. The Coriolis flow meter assembly 100 includes manifolds 110, 111, flow-sensitive tubes 112, 113, and an isolating structure 114. The assembly 100 can have one or more flow-sensitive tubes 112. The assembly 100 shown in FIGS. 1A-1B, includes two flow-sensitive tubes 112, 113.

Manifolds 110, 111 fluidly couple the Coriolis flow meter assembly 100 to a larger system of which the Coriolis flow meter can measure the mass flow rate of a flowing fluid. Manifolds 110, 111 also include internal flow paths to separate or combine fluid flowing to or from the flow-sensitive tubes 112, 113. The flow-sensitive tubes 112, 113 can be vibrated at pre-determined frequencies. As fluid flows through the flow-sensitive tubes 112, 113, the frequency of vibration is shifted. The mass flow rate of the fluid flowing through the flow-sensitive tubes 112, 113 can be determined based on the shift in the frequency of vibration. The isolating structure 114 can isolate the flow-sensitive tubes 112, 113 from vibrations external to the Coriolis flow meter assembly 100. The isolating structure 114 can establish the boundary conditions for the flow-sensitive tubes 112, 113. The boundary conditions can relate to the effect the mass flow rate has on the shift in vibrational frequency.

Each manifold 110 or 111 includes a body 116, tubular port extensions 118 extending outward from a surface of the body 116, and an inlet/outlet 120. In some examples, each manifold 110 or 111 can include holes 122 to facilitate attachment to a support structure (e.g., isolating structure 114). The body 116 provides a structure onto which the tubular port extensions 118 are connected and through which the fluid (whose flow rate is measured) passes. In some implementations, the body 116 is fabricated from a polymeric material. For example, the body 116 can be fabricated by CNC (computer numerical control) machining from a single piece of polymeric material. In some implementations, the body 116 is fabricated from a polymeric material by injection molding, or other molding process. For example, manifold flow passageways interior to the body 116 and connecting the inlet/outlet 120 with the tubular port extensions 118 can be molded in situ or bored in a separate machining operation after molding of the body 116. The inlet/outlet 120 can be on an adjacent side 124 of the body 116 relative to the tubular port extensions 118 as shown in FIGS. 1A-1B. In some implementations, the inlet/outlet 120 can be on an opposite side 126 of the body 116 relative to the tubular port extensions 118.

In some embodiments, the body 116 and the tubular port extensions 118 are fabricated together from a single piece of polymeric material. For example, the body 116 and tubular port extensions 118 can be fabricated using CNC machining from a single piece of polymeric material or by molding a single piece of polymeric material. The body 116 (and any elements of manifold 110 fabricated with the body) can be fabricated from one of any of a number of polymeric materials, including but not limited to, commercially available polymeric materials (e.g., PFA, poly(ether ether ketone) (PEEK), poly(vinylidene fluoride) (PVDK), poly(tetrafluoroethylene) (PTFE), poly(fluorinated ethylene propylene) (FEP) or custom polymers and polymer blends.

The tubular port extensions 118 connect to the body 116 and ultimately connect to the flow-sensitive tubes 112, 113. In operation, the tubular port extensions 118 vibrate as continuous extensions of the flow-sensitive tubes 112, 113. The flow-sensitive tubes 112, 113 can be connected to the tubular port extensions 118 by a weld. For example, a weld surface of each tubular port extension 118 connects to an open end of the corresponding flow-sensitive tube placing the flow-sensitive tubes 112, 113 in fluid communication with corresponding manifold fluid passageways. The tubular port extensions 118 can have the same nominal outside and inside diameters and dimensional tolerances as the flow-sensitive tubes 112, 113. These tolerances facilitate precise alignment and welding of the tubular port extensions 118 to the flow-sensitive tubes 112, 113, as described below. In some implementations, the tubular port extensions 118 are formed integral with the body 116 (either by machining or molding). For example, the tubular port extensions 118 can be formed with the body 116 and thus joined to the body seamlessly as a single structure that is without a separate or distinct mechanical connection between the tubular port extensions 118 and the body 116. As described below, welding can be used to add components (e.g., the flow-sensitive tubes and/or tubular port extensions) in a way so that they are integral to the body 116.

The isolation structure 114 is clamped around a portion of the tubular port extensions 118 adjacent to a surface of the manifolds 110. In some implementations, the isolation structure 114 includes outer shells 130 and 132, and a center shell 134. Port extensions corresponding to flow-sensitive tube 112 are clamped between the outer shell 130 and the center shell 134. Port extensions corresponding to flow-sensitive tube 113 are clamped between outer shell 132 and the center shell 134. The isolation structure 114 can be made of a different material than the manifolds 110 and the flow-sensitive tubes 112, 113. For example, the isolation structure 114 can be made from a metal, such as stainless steel. The isolation structure 114 can also be made from a polymer material.

In some implementations, a Coriolis flow meter includes a single flow-sensitive tube. In these implementations, the isolating structure includes two outer shells 130, 132 without a center shell 134. The outer shells 130, 132 are clamped around the tubular port extensions of each manifold of the Coriolis flow meter.

The isolation structure 114 establishes the boundary condition for vibration of the flow-sensitive tubes 112, 113 by providing fixed nodes from which vibration is measured. The isolation structure 114 influences the flow meter's dynamic frequency response characteristics. For example, when operating a Coriolis flow meter, the flow-sensitive tubes 112, 113 are vibrated opposite one another in phase opposition (e.g., "anti-phase") at their natural frequency, resulting in motion akin to that of a tuning fork. Additionally, the flow-sensitive tubes 112, 113 can also vibrate together in unison (e.g., symmetrically "in-phase"). Depending on the rigidity of the connection between the flow-sensitive tubes 112, 113 and the body 116 and the material and dimensions of the flow-sensitive tubes 112, 113 the natural frequency of the in-phase vibration can be close (if not identical) to that of the anti-phase vibration. The closer the two frequencies, the greater the risk of flow meter instability because vibrational excitation energy will be shared uncontrollably between the two (in-phase and anti-phase) vibrational modes. When operating a Coriolis flow meter at its natural frequency, the natural frequency of all vibrational modes can be sufficiently well-separated so as to not interfere with the sensor's operation.

The isolation structure 114 creates well-defined vibrational boundary conditions that cause the frequency of the in-phase and anti-phase modes to be separated by allowing different portions of the flow-sensitive tubes 112, 113 (which have different masses and moments of inertia) to participate in the in-phase and anti-phase vibrations. The dimensions and thickness of the isolation structure 114 also influence the flow meter's frequency response because the isolation structure 114 affects the stiffness of the vibrating flow-sensitive tubes 112, 113 in the anti-phase mode. The isolation structure 114 directly influences a sensor's frequency response characteristics to allow for satisfactory performance. In some implementations, brace bars 140 can be used to further tune the natural frequencies of the in-phase and anti-phase vibrational modes.

In some implementations, the vibrational boundary conditions are further improved by filling the annular gap 135 that is formed between the isolating structure 114 and the flow sensitive tubes 112, 113 with a filler material. The filler material can include, for example, an epoxy, an adhesive, a sealant, a foam or other suitable filler material.

The isolation structure 114 also provides vibrational isolation from external sources (e.g., the structure to which the Coriolis flow meter is mounted) and allows frequency separation between the modes of the flow-sensitive tubes 112, 113, whether vibrating in anti-phase or in-phase modes.

Plumbing connections configured at the inlet/outlet 120 of manifold 110 allow fluid to flow through each flow-sensitive tube 112, 113 in a hydraulically parallel manner via the internal manifold fluid passageways. Open ends of flow-sensitive tubes are each welded to the corresponding weld surface of tubular port extensions 118. The welding operation of each of the flow-sensitive tubes to the corresponding tubular port extensions is, in some embodiments, performed simultaneously. This aspect of a fabrication method is described below in more detail in reference to FIG. 5.

The polymer joint 150 can be an adhesive-free junction between the tubular port extension 118 and the open end of the flow-sensitive tube 112. For example, the polymer joint 150 joins elements fabricated from the same polymer material because the various elements of the manifold 110 and the flow-sensitive tubes 112, 113 can all be fabricated or molded from the same polymeric material. Thus, the tubular port extensions 118 and the open ends of the flow-sensitive tubes 112, 113 need only be heated to within a weld temperature range (determined according to the polymeric material used) and put into contact with one another to form the polymer joint 150. In some embodiments, it is beneficial to weld all of the open ends of the flow-sensitive tubes to all of the tubular port extensions 118 simultaneously. This can be beneficial because it is more likely to produce a flow meter in which the moments of inertia in both flow-sensitive tubes 112, 113 are sufficiently close so as to be balanced. If the welds are made separately, it is more likely that at least one dimensional tolerance of a weld will not be met. Welds outside of a dimensional tolerance can result in a vibrating structure that would not have balanced moments of inertia because the lengths of the flow-sensitive tubes 112, 113 (constituting the vibrating structure) would be different.

Inequality in moments of inertia of each flow-sensitive tube 112, 113 can result in a dynamically unbalanced structure adversely affecting the accuracy of the flow meter (and zero-flow offset stability). For example, an unbalanced structure is more sensitive to fluid and ambient temperature variations and more susceptible to external vibrations, thus rendering the measurements of the device less accurate, less precise, and less reliable. The details of the fabrication method for producing flow-sensitive tubes with balanced moments of inertia are described in more detail below.

FIGS. 1A-1B also show tabs 160, which are used to facilitate mounting of motion responsive devices 162 to the flow-sensitive tubes 112, 113. The tabs 160 slide on to, clamp, or are otherwise attached to the flow-sensitive tubes 112, 113 or the tubular port extensions 118. The tabs 160 can be fabricated from a polymeric material, but not necessarily of the same material used to fabricate other elements of the manifold 110. For example, the material used to fabricate the tabs 160 may be different from that of the flow-sensitive tubes 112, 113 and may have a thermal expansion coefficient less than that of the material used to fabricate the flow-sensitive tubes 112, 113. A benefit of this is that the tabs 160 are more likely to maintain contact with the flow-sensitive tubes 112, 113 as the temperature of the system changes, thus maintaining measurement accuracy.

FIGS. 2A-2E show plan views of a variety of shapes 205-225 of flow-sensitive tubes 112, 113 that can be connected to manifolds 110, 111 (represented schematically as rectangular blocks). Any of the depicted example tube shapes 205-225 can be selected to meet the requirements of a particular flow measurement application. In some cases, the flow-sensitive tubes are U-shaped (e.g., 215), V-shaped (e.g., 220), or Ω-shaped (e.g., 210). In some cases, the flow-sensitive tubes are straight (e.g., 225). One benefit of fabricating manifolds 110, 111 according to the present disclosure is that any of a variety of tube shapes can be integrated for use as flow-sensitive tubes without having to design entirely new manifolds 110, 111.

In some implementations, a second isolating structure is provided, for example, implementations using straight flow-sensitive tubes. The first isolating structure is clamped around a portion of the tubular port extension(s) of the first manifold and positioned adjacent to a surface of the first manifold. The second isolating structure is clamped around a portion of the tubular port extension(s) of the second manifold and positioned adjacent to a surface of the second manifold.

Figure 3:
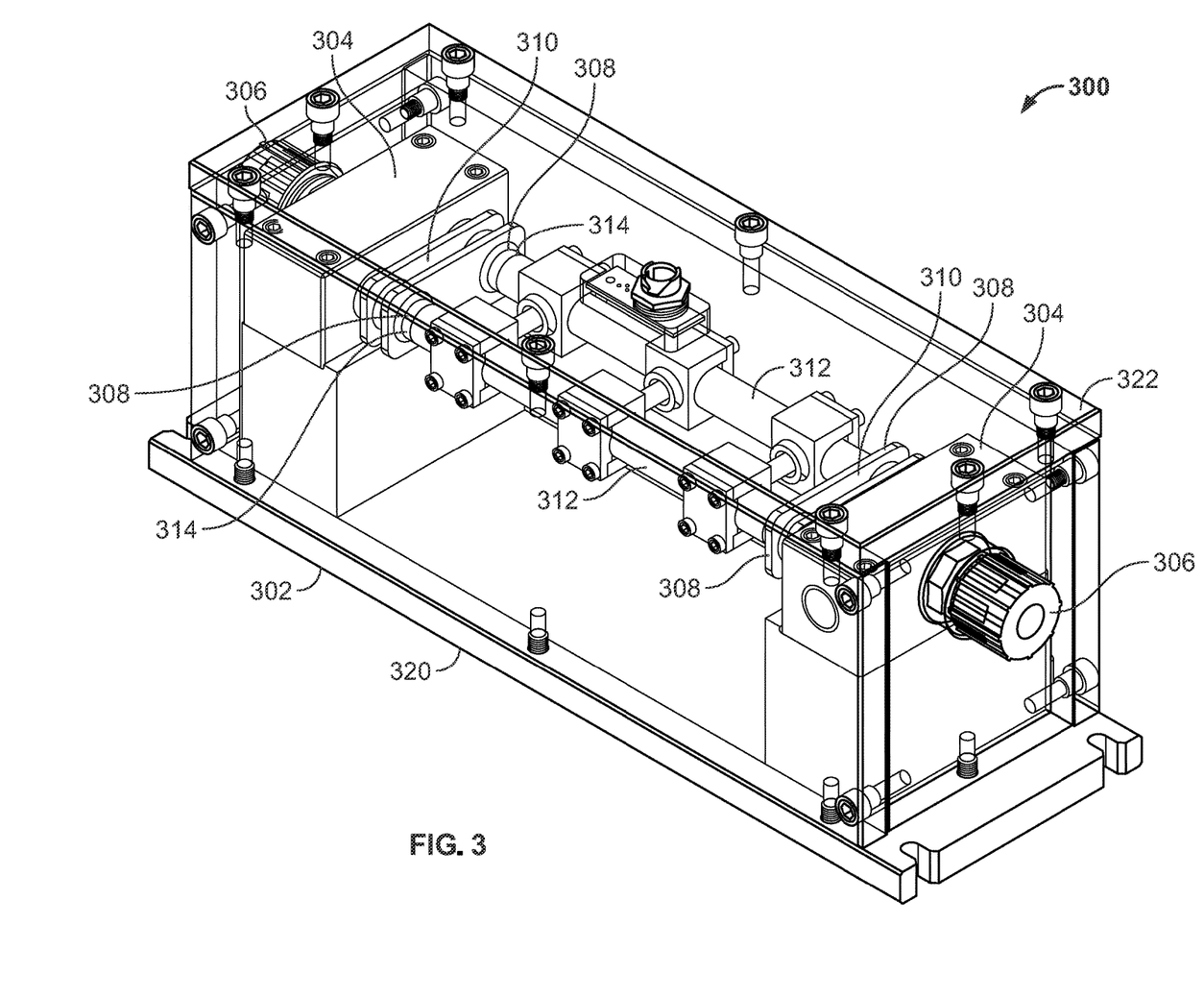
FIG. 3 illustrates an isometric view of a Coriolis flow meter with straight flow-sensitive tubes and integrated isolation plates.

FIG. 3 shows an isometric view 300 of an example Coriolis flow meter 302. The Coriolis flow meter 302 includes two manifolds 304 made from a polymer material each manifold having an inlet/outlet 306, and two tubular port extensions 308. Fluid can flow through the Coriolis flow meter 302 in either direction. For example, flow of the fluid to be measured can be from either inlet/outlet 306 to the other inlet/outlet 306. Isolation plates 310 are integrated into the manifold 304 and made from the same polymer material. The isolation plates 310 establish the boundary condition for the frequency response of the flow meter 302. The isolation plates 310 can be fabricated at the same time as the body of the manifold. The isolation plates 310 are located between the body of the manifold 304 and the opening of the tubular port extensions 308. Two straight flow-sensitive tubes 312 are welded to the tubular port extensions 308 of each manifold 304. Polymer joints 314 can be formed using a process similar to the welding process described in relation to FIG. 5. The manifolds 304 are attached to a base 320. The base 320 can be made of a metal, for example, stainless steel. The base 320 has a much larger mass than the polymer manifolds 304 and flow-sensitive tubes 312. For example, the base 320 can have a mass at least 2-20× the mass of the polymer elements (304-312). The larger mass of the base 320 can aid in vibration isolation from flow fluctuations within the flow system attached to the inlets/outlets 306 and other vibrations external to the flow meter 302. A protective enclosure 322 can be attached to the base 320 to enclose the manifolds 304, flow-sensitive tubes 312, and isolation plates 310. In some implementations, the base can be made of a plastic or polymer material (e.g., for a flow meter in a corrosive environment), and mass can be added inside of the protective enclosure to aid in vibration isolation. In some implementations, the protective enclosure 322 can be made from a gamma transparent material allowing the flow meter 302 to be sterilized using gamma irradiation.

Figure 4A:
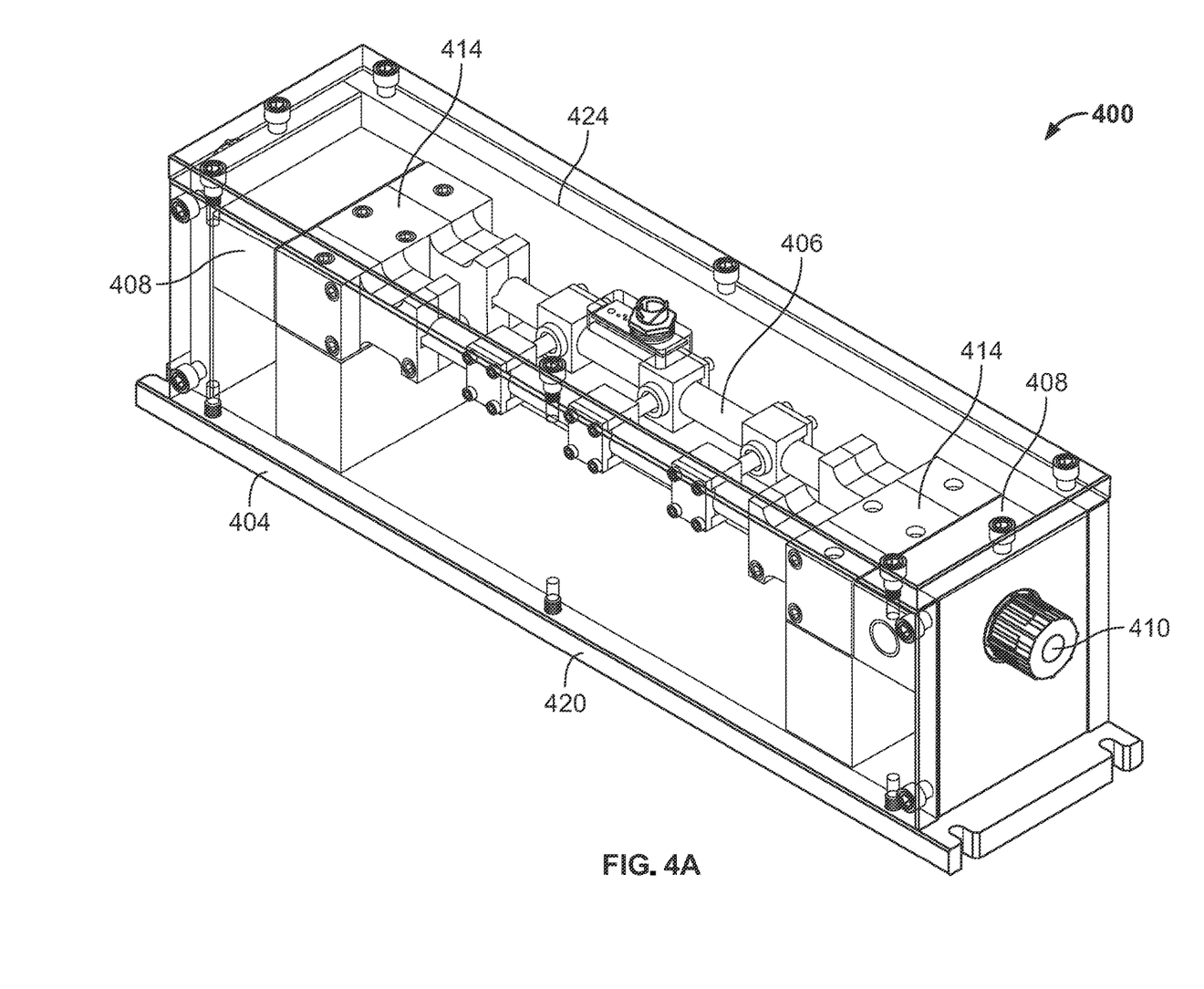
FIG. 4A illustrates an isometric view of a Coriolis flow meter with straight flow-sensitive tubes and a separate isolating structure.
Figure 4B:
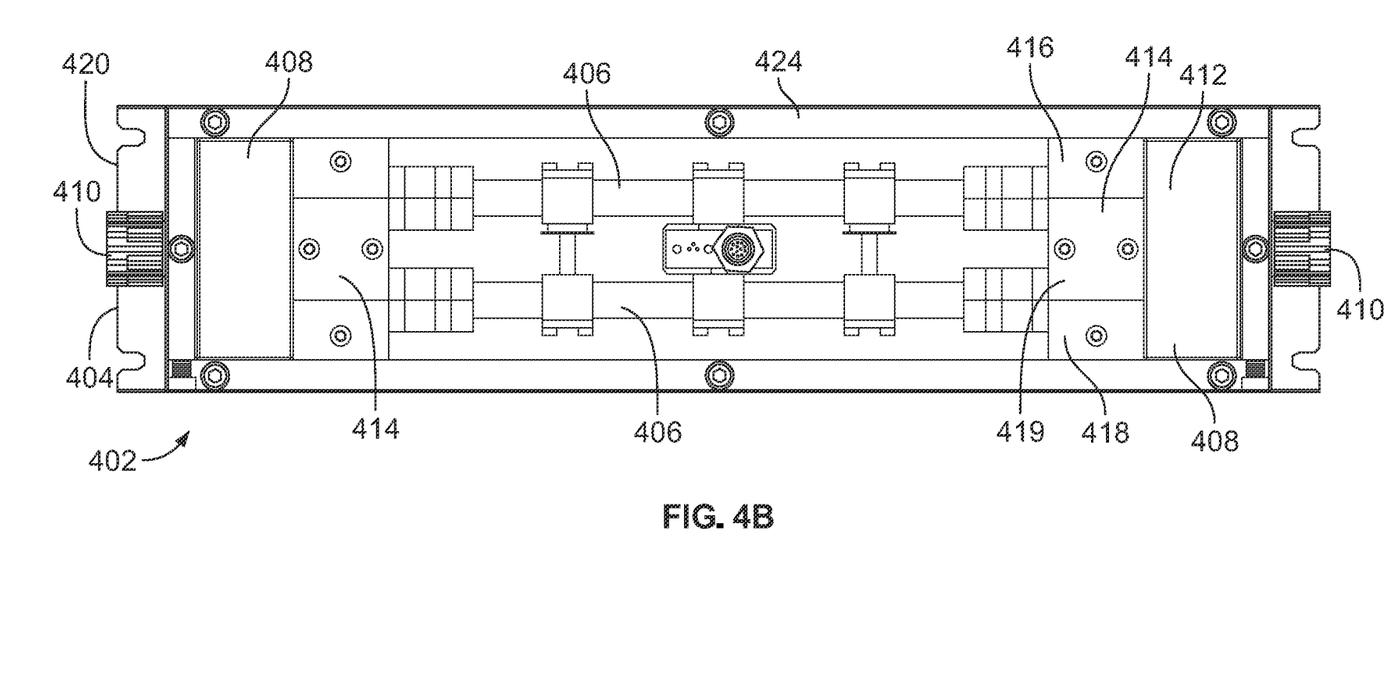
FIG. 4B illustrates a plan view of a Coriolis flow meter with straight flow-sensitive tubes and a separate isolating structure.

FIGS. 4A-4B show an isometric view 400 and top view 402 of a Coriolis flow meter 404 having straight flow-sensitive tubes 406. Two manifolds 408 are formed out of a polymer material each manifold 408 having an inlet/outlet 410 on one side of the body 412 of the manifold 408 and tubular port extensions on the side opposite the inlet/outlet 410. The flow-sensitive tubes 406 are welded to the tubular port extensions forming a polymer joint. Two isolation structures 414 are made, for example, from metal such as stainless steel or from a polymer material. The isolation structures 414 are clamped around the tubular port extensions and positioned adjacent a surface of the manifolds 408. The isolation structures 414 include outer shells 416, 418, and a center shell 419. The isolation structures 414 attach to a base 420. In this example, the manifolds 408 are attached to the base 420 by the isolating structures 414. The base 420 can be made of the same material as the isolation structures 414 or the base 420 can be made of a different material. The base 420 can have a larger mass than the polymer elements (406-412) of the flow meter 404. A protective enclosure 424 can be attached to the base 420 to protect the flow-sensitive elements of the flow meter 404. The protective enclosure can be made of a gamma transparent material allowing the flow meter 404 to be sterilized using gamma irradiation.

Figure 5:
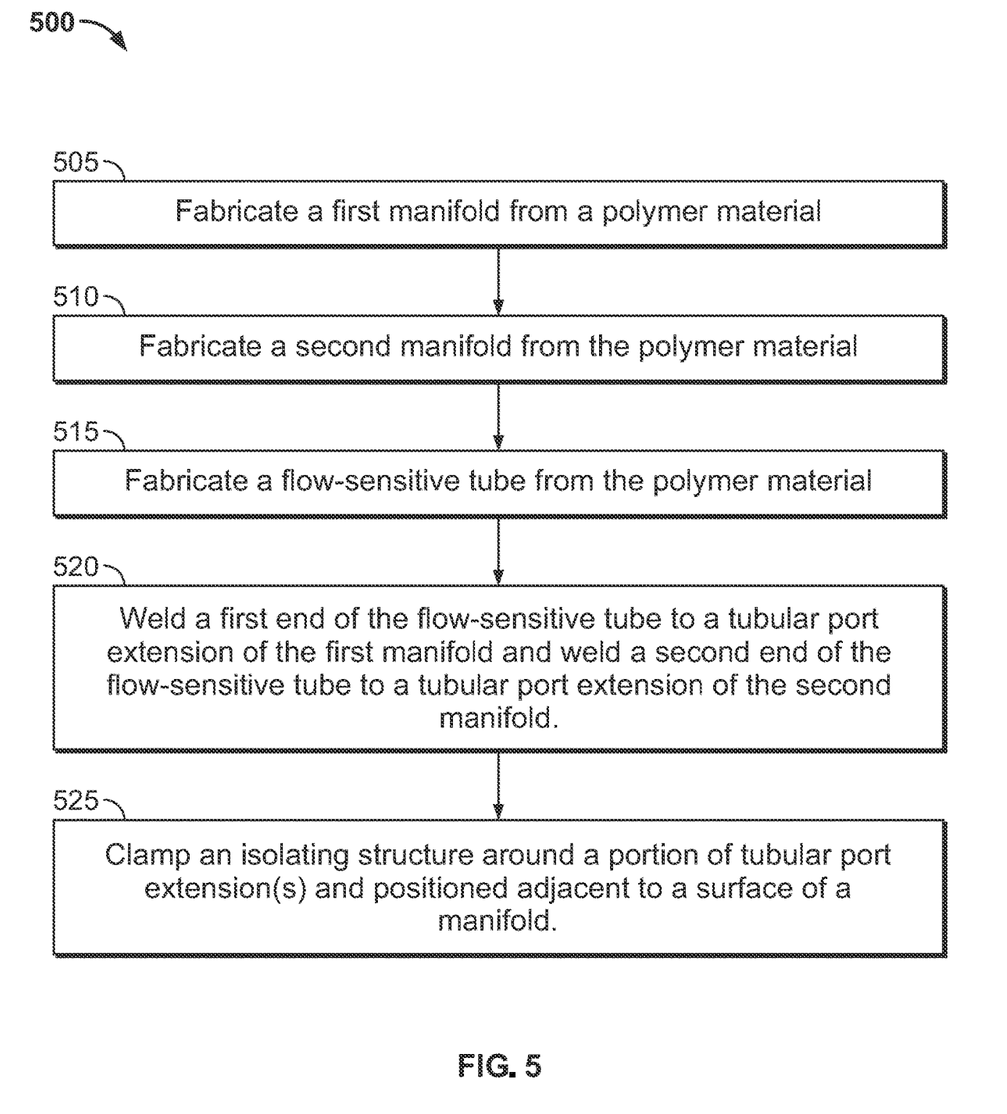
FIG. 5 illustrates a flow chart for a method of fabricating a Coriolis flow meter.

FIG. 5 is a flow diagram of an example method 500 for fabricating a Coriolis flow meter. A first manifold 110 is fabricated (505). For example, the first manifold 110 can be fabricated from a single polymer material through CNC machining or through molding (e.g., injection molding). As described above, the manifold 110 as fabricated includes the body 116 and tubular port extensions 118. The polymer used can be any of a variety of commercially available polymers (e.g., PFA, PEEK, PVDF, PTFE, FEP) or a custom polymer or polymer blend. The manifold flow passageways through the body 116 can be fabricated with the manifold in a single step or drilled (or otherwise made) subsequent to the fabrication of the manifold body 116.

A second manifold 111 is fabricated (510). For example, the second manifold 111 can be fabricated from a single polymer material. Similar methods can be used to fabricate the second manifold 111 as discussed above in reference to step 505. The second manifold 111 also includes a body 116 and tubular port extensions 118.

The flow-sensitive tubes 112, 113 are fabricated (515). The flow-sensitive tubes 112, 113 can be fabricated using the same polymer material used to fabricate the first manifold 110 and to fabricate the second manifold 111. The flow-sensitive tubes 112, 113 are, in some cases, commercially available tubes that are formed into a particular shape (such as those shown in FIGS. 2A-2E). Shaping includes heating the tubing to near (or at or slightly above) the glass transition temperature of the polymer, forming the tube into a desired shape (for example, using a plate or other mold with the desired shape machined into it), maintaining the temperature to allow any mechanical stresses within the shaped tube to dissipate, and cooling the flow-sensitive tube 112, 113 in a controlled manner. This heating performed during the shaping process is also known as annealing, the temperatures and temperature profile of which will vary depending on the polymeric material used. In some implementation, the annealing process can occur before welding of the flow sensitive tube 112, 113 to the manifold 110, 111. In other implementations, the annealing process can occur after welding of the flow sensitive tube 112, 113 to the manifold 110, 111.

The flow-sensitive tubes 112, 113 can be fabricated from commercially available (or custom-fabricated) polymeric tubing (including but not limited to PFA, PEEK, PVDF, PTFE, FEP) in order to meet the design requirements of a particular flow measurement application and to match the polymer material of the manifolds 110, 111. While the inner and outer diameters of the flow-sensitive tubes 112, 113 (and corresponding matching tubular port extensions) can be any values, the dimensional tolerances of these diameters (and/or a wall thickness) can be within a range of a few tenths of a millimeter. These tolerances facilitate accurate alignment of the flow-sensitive tubes 112, 113 with the tubular port extensions during welding.

Open ends of the flow-sensitive tubes 112, 113 are welded to welding surfaces of the tubular port extensions 118 (520). A first end of the flow-sensitive tube 112, 113 is welded to a tubular port extension 118 of the first manifold 110 and a second end of the flow-sensitive tube 112, 113 is welded to a tubular port extension 118 of the second manifold 111. Open ends of the tubular port extensions 118 and open ends of the flow-sensitive tubes 112, 113 are heated to within a weld temperature range that is a function of the selected polymer. This can be performed using, for example, a resistive heating element (e.g., a ceramic or metallic heating element) that is inserted between the physically proximate welding surfaces of the tubular port extensions 118 and the open ends of the flow-sensitive tubes 112, 113 locally heating the surfaces to be welded. Once the welding surfaces and open ends reach the desired temperature, the heating element is removed. The open ends and welding surfaces are brought into contact simultaneously. A benefit of simultaneous welding is the lengths of the flow-sensitive tubes 112, 113 will be nearly the same so that, when used in the flow meter, the flow-sensitive tubes 112, 113 have the same (or approximately the same) moments of inertia. Similarly, the simultaneous welding facilitates proper positioning of the flow-sensitive tubes 112, 113 so that dimensions based on the location of the flow-sensitive tubes 112, 113 are within a design tolerance. Other dimensions, such as inner and outer diameters can also be within the design tolerance of the target dimension. Another benefit of welding is that it flows polymer from both sides of the weld together, thus integrating the flow-sensitive tubes 112, 113 with the tubular port extensions 118 seamlessly, without a separate mechanical joint that can degrade or reduce flow meter performance.

A fixture can be used to hold the flow-sensitive tubes 112, 113 to facilitate simultaneous and accurate welding. For example, the flow-sensitive tubes 112, 113 can be placed in a fixture configured to position the opens ends of the flow-sensitive tubes 112, 113 precisely relative to one another and relative to the welding surfaces of the tubular port extensions 118 so that dimensional tolerances are met. The fixture is also configured to translate the flow-sensitive tubes 112, 113 precisely and in a controlled way. Examples of such fixtures include translation tables used on machine tools, including those with surfaces of known planarity (e.g., planar to within 0.0001 of an inch).

Figure 6:
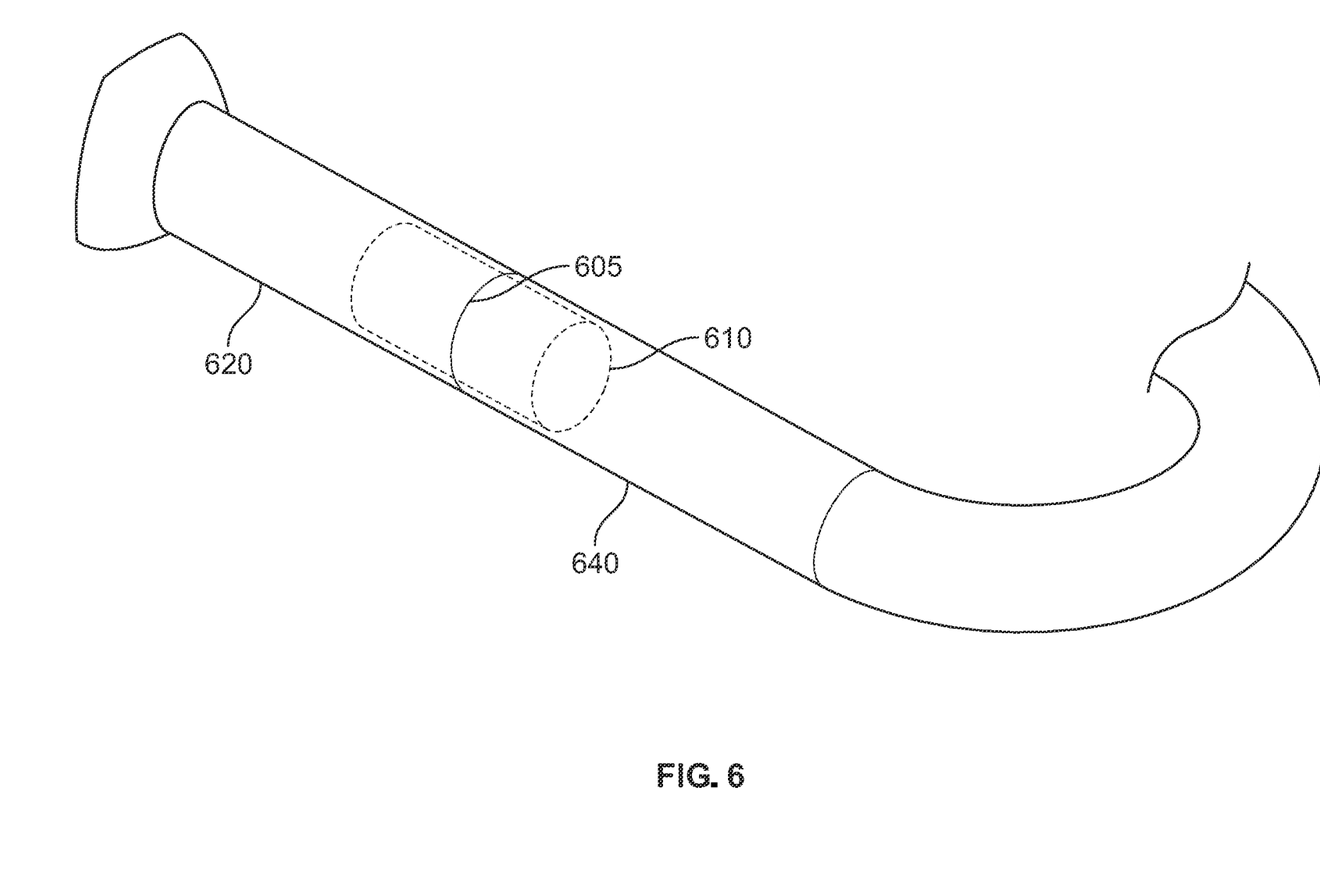
FIG. 6 illustrates a pin inserted into a flow-sensitive tube during welding.

In some examples, one or more pins can be inserted through a manifold fluid passageway of the body 116 to a location inside the flow-sensitive tube 112 or 113 and tubular port extension 118 that corresponds to the polymer joint (shown in FIGS. 1A-1B as polymer joint 150). An example of this is shown in FIG. 6, in which the pin 610 is within the tubular port extension 620 and the flow-sensitive tube 640 at a location corresponding to the polymer joint 605. The pin 610 will be in intimate contact with the inner surfaces of the tubular port extension 620, the flow-sensitive tube 640, and the polymer joint 605. However, some separation between the pin 610 and these surfaces is shown in FIG. 6 for clarity. The pin 610, made from any non-contaminating material that is mechanically and chemically stable in the weld temperature range of the polymer used to fabricate the manifold 110, 111 and flow-sensitive tubes 112, 113, is used to prevent any extrusion or flow of polymer from the polymer joint 605 to the interior of the flow passageway. This preserves the unobstructed continuity of the flow passageway needed for accurate measurements. The pin 610 is then removed after solidification of the polymer joint 605.

After welding, the assembled manifolds 110 and 111 are cooled in a controlled way to allow mechanical stresses introduced during any of the foregoing steps to dissipate. The temperatures and temperature vs. time profile of the cooling is a function of the polymer used to fabricate the assembled flow meter.

Another benefit of the annealing process is to reduce the risk of excessive polymer flow and warping from excessive thermal gradients across the tubular parts during an uncontrolled cooling process or a faster cooling rate. This helps maintain dimensional control of the tubular elements to within several thousands of an inch. This is used to preserve the substantially equal moments of inertia in each vibrating flow-sensitive tube 112, 113.

An isolating structure 114 is clamped around a portion of the first tubular port extension 118 and positioned adjacent to a surface of the first manifold 110 (525). The isolating structure 114 can be mounted to a base and a protective enclosure can be attached to the base to enclose the manifolds 110, 111, flow-sensitive tubes 112, 113, and isolating structure 114.

In some implementations, such as the embodiments shown in FIGS. 1A-1B, the isolating structure 114 is clamped around a portion of each tubular port extension 118 of both manifolds 110, 111 and adjacent to the surface of both the first manifold 110 and second manifolds 111.

A number of embodiments of these systems and methods have been described. Nevertheless, it will be understood that various modifications may be made without departing from the scope of this disclosure. Accordingly, other embodiments are within the scope of the following claims.

What is claimed is:

1. A Coriolis flow meter comprising:
a first manifold made from a polymer material and comprising a first tubular port extension extending outward from a surface of the first manifold;
a second manifold made from the polymer material and comprising a second tubular port extension extending outward from a surface of the second manifold;
a flow-sensitive tube made from the polymer material, the flow-sensitive tube attached at a first end to the first tubular port extension and attached at a second end to the second tubular port extension; and
an isolating structure clamped around a portion of the first tubular port extension and positioned adjacent to the surface of the first manifold, the isolating structure made from a second material different from the polymer material.

2. The Coriolis flow meter of claim 1, wherein the isolating structure isolates the flow-sensitive tube from vibrations external to the Coriolis flow meter.

3. The Coriolis flow meter of claim 1, wherein the isolating structure comprises stainless steel.

4. The Coriolis flow meter of claim 1, wherein the isolating structure is clamped around a portion of the first tubular port extension and the second tubular port extension and positioned adjacent to both the surface of the first manifold and the surface of the second manifold.

5. The Coriolis flow meter of claim 4, wherein the flow-sensitive tube is a U-shaped tube, a V-shaped tube, or an Ω-shaped tube.

6. The Coriolis flow meter of claim 1, further comprising a second isolating structure clamped around a portion of the second tubular port extension and positioned adjacent to the surface of the second manifold, and
wherein the flow-sensitive tube is a straight tube.

7. The Coriolis flow meter of claim 6, further comprising:
a base, wherein the isolating structure is mounted to the base; and
a protective enclosure connected to the base enclosing the first manifold, the second manifold, and the flow-sensitive tube.

8. The Coriolis flow meter of claim 1, wherein the flow-sensitive tube is welded to the first tubular port extension and to the second tubular port extension.

9. The Coriolis flow meter of claim 1, further comprising a second flow-sensitive tube made from the polymer material, and
wherein the first manifold comprises a third tubular port extension extending outward from the surface of the first manifold,
wherein the second manifold comprises a fourth tubular port extension extending outward from the surface of the second manifold,
wherein the second flow-sensitive tube is attached at a first end to the third tubular port extension and attached at a second end to the fourth tubular port extension.

10. The Coriolis flow meter of claim 9, wherein the isolating structure is clamped around a respective portion of each of the first, second, third, and fourth tubular port extensions, and positioned adjacent to both the surface of the first manifold and the surface of the second manifold.

11. The Coriolis flow meter of claim 10, wherein the isolating structure comprises a first outer shell, a second outer shell, and a center shell,
wherein the first and second tubular port extensions are clamped between the first outer shell and the center shell, and
wherein the third and fourth tubular port extensions are clamped between the second outer shell and the center shell.

12. A method for fabricating a Coriolis flow meter, the method comprising:
fabricating a first manifold made from a polymer material comprising a first tubular port extension extending outward from a surface of the first manifold;
fabricating a second manifold made from the polymer material comprising a second tubular port extension extending outward from a surface of the second manifold;
fabricating a flow-sensitive tube from the polymer material;
welding a first end of the flow-sensitive tube to the first tubular port extension and welding a second end of the flow-sensitive tube to the second tubular port extension; and
clamping an isolating structure around a portion of the first tubular port extension and positioned adjacent to the surface of the first manifold, the isolating structure made from a second material different from the polymer material.

13. The method of claim 12, further comprising:
temporarily inserting a pin, during welding, to a location that is inside the flow-sensitive tube and the first tubular port extension, the location corresponding to a polymer joint, the pin in intimate contact with the polymer joint to prevent polymer from the polymer joint from flowing into the flow-sensitive tube.

14. The method of claim 13, wherein the welding further comprises:
locally heating weld surfaces of the first and second tubular port extensions to within a weld temperature range of the polymer material;
locally heating the first end and the second end of the flow-sensitive tube to within the weld temperature range of the polymer material; and
joining the first end of the flow-sensitive tube to the first tubular port extension and the second end of the flow-sensitive tube to the second tubular port extension simultaneously while each end of the flow-sensitive tube and each weld surface are within the weld temperature range of the polymer material.

15. The method of claim 12, wherein the isolating structure comprises stainless steel.

16. The method of claim 12, wherein the flow-sensitive tube is a U-shaped tube, a V-shaped tube, or an Ω-shaped tube.

17. The method of claim 12, wherein the flow-sensitive tube is a straight tube.

18. The method of claim 17, further comprising:
mounting the isolating structure to a base; and
connecting a protective enclosure to the base enclosing the first and second manifolds and the flow-sensitive tube.

19. A method comprising:
providing a first manifold made from a polymer material comprising a first tubular port extension extending outward from a surface of the first manifold;
providing a second manifold made from the polymer material comprising a second tubular port extension extending outward from a surface of the second manifold;
providing a flow-sensitive tube made from the polymer material;
welding a first end of the flow-sensitive tube to the first tubular port extension and welding a second end of the flow-sensitive tube to the second tubular port extension; and
clamping an isolating structure around a portion of the first tubular port extension and positioned adjacent to the surface of the first manifold, the isolating structure made from a second material different from the polymer material.

20. The method of claim 19, further comprising:
temporarily inserting a pin, during welding, to a location that is inside the flow-sensitive tube and the first tubular port extension, the location corresponding to a polymer joint, the pin in intimate contact with the polymer joint to prevent polymer from the polymer joint from flowing into the flow-sensitive tube.

21. The method of claim 19, wherein the flow-sensitive tube is a straight tube.

22. The method of claim 21, further comprising:
mounting the isolating structure to a base; and
connecting a protective enclosure to the base enclosing the first manifold and second manifold and the flow-sensitive tube.

* * * * *